June 25, 1963 D. G. MAGILL, JR., ETAL 3,095,315
PROCESS OF MAKING A POROUS, COATED MATERIAL
Filed May 3, 1961
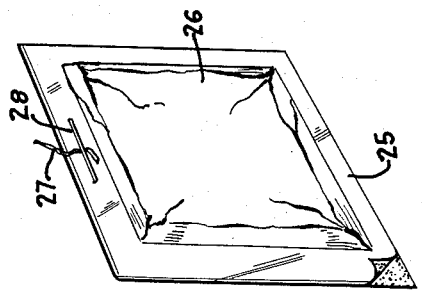
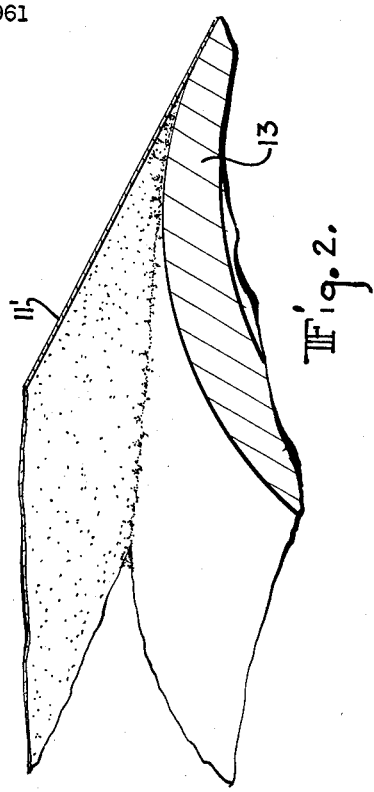
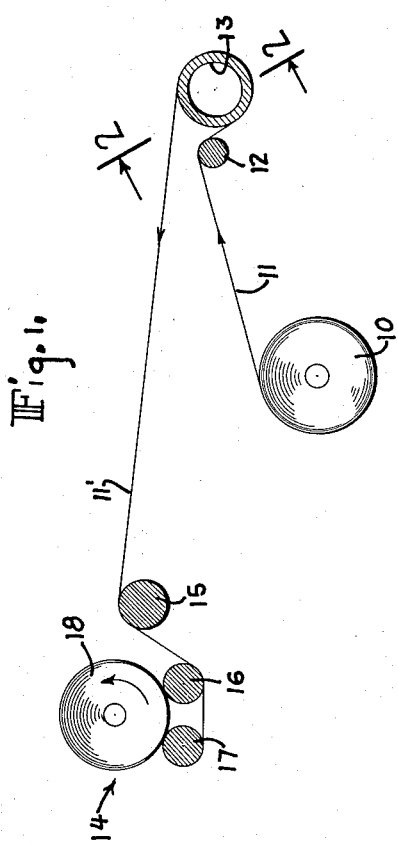
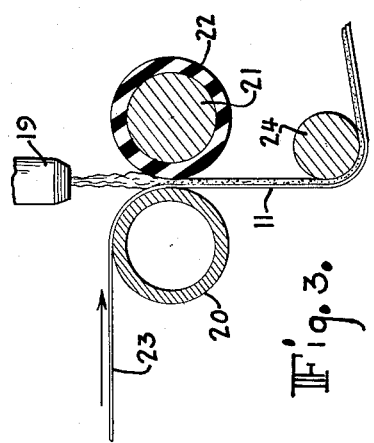
INVENTORS
Donald G. Magill, jr.
Joseph W. Judge, jr.
BY
Pennie, Edmonds, Morton, Barrows & Taylor
ATTORNEYS United States Patent Office 3,095,315
Patented June 25, 1963

3,095,315
PROCESS OF MAKING A POROUS, COATED MATERIAL
Donald G. Magill, Jr., and Joseph W. Judge, Jr., Milford, N.J., assignors to Riegel Paper Corporation, New York, N.Y., a corporation of Delaware
Filed May 3, 1961, Ser. No. 107,586
9 Claims. (Cl. 117—10)

This application is a continuation-in-part of our application Ser. No. 651,221, filed April 8, 1957, now abandoned.

The present invention is concerned with the making of porous, coated materials, and relates more particularly to the making of porous laminates, wherein one of the components is a normally porous material while the other component is a normally non-porous material.

More specifically, the present invention relates to the making of porous, coated materials in a manner such that one or more desirable characteristics are imparted to at least one surface of a porous base material by a normally non-porous material while the desirable porosity characteristics of the base material are largely retained.

Perhaps the most important aspect of the invention relates to the making of tea bag tissue coated with a layer of polyethylene, or other normally non-porous plastic material having similar characteristics, the coating being accomplished in a manner such that the coated tissue is rendered heat-sealable, while at the same time the original porosity of the tea bag tissue is largely retained. In this respect the invention encompasses an improved article of manufacture as well as an improved method for making the article.

A related aspect of the invention concerns the making of porous, coated materials, such as fabrics and various papers, for example, to the end that desired surface characteristics are imparted to the base material, while the porosity thereof is retained; and in this respect, also, the invention encompasses improved articles of manufacture, as well as an improved method of making the articles.

In general, the method of the invention involves the treating of a web of porous base material, coated with a layer of normally non-porous plastic material, in a manner such that the layer of normally non-porous material is rendered porous, largely to the extent of the base material. In accordance with the method of the invention, the layer of normally non-porous material is rendered porous in an efficient continuous process, without damaging or otherwise adversely affecting the base material.

In connection with the manufacture of coated tea bag tissue, substantial advantages are realized, in that the finished tissue may be economically formed into tea bags by rapid and efficient heat-sealing techniques. For example, a tea bag tissue coated with a porous layer of polyethylene is advantageous in that the polyethylene layers, placed in face-to-face relation, may be readily heat sealed to form a bag, and the polyethylene material imparts no undesirable taste or odor to the tea when immersed in hot or boiling water. Moreover, it has been found that the provision of a porous layer of polyethylene on one surface of a web of tea bag tissue materially increases the wet strength of the tissue and thereby enables the reduction of costly wet strength additives.

In connection with the manufacture of products other than tea bag tissue, the provision of a porous layer of polyethylene or similar material has similar and in some cases additional advantages. For example, in the manufacture of coated fabrics in accordance with the invention, great resistance to wear may be imparted to the fabric while at the same time not impairing the porosity thereof so that adequate ventilation through the fabric is afforded.

The method of the present invention is in one respect useful in the processing of porous base materials which have been provided theretofore with a non-porous coating of plastic material. However, the method is equally applicable to a continuous, integrated process in which the base material is first coated with non-porous material, and the non-porous materials is thereafter rendered porous.

For a better understanding of the invention reference should be made to the following specification and the accompanying drawings, in which:

FIG. 1 is a simplified schematic representation of a system in which the method of the invention may be carried out;

FIG. 2 is an enlarged fragmentary perspective view of a part of the system of FIG. 1, illustrating the manner in which a non-porous layer is rendered porous, in accordance with the invention;

FIG. 3 is a simplified schematic representation of an apparatus for applying a layer of non-porous material to a porous base web, the apparatus being advantageously adapted for incorporation in the system of FIG. 1; and FIG. 4 is a perspective view of an article, such as a tea bag, made with materials processed in accordance with the invention.

Referring now to the drawing, and initially to FIG. 1 thereof, the numeral 10 designates a roll or coil of coated base web material such as porous tea bag tissue coated on one surface with a layer of non-porous plastic material. By way of example, the base web material may be a tea bag tissue having a normal porosity of about 115–160 (ft.$^3$/min./ft.$^2$ of air at ½″ water), and the non-porous plastic layer may be polyethylene in a layer of substantially uniform thickness and in an amount not substantially less than ½ pound nor substantially more than 3½ pounds per ream (24″ x 36″ x 500) of base web material.

In the system of FIG. 1, a roll 10 of coated base web material is rotatably supported by a suitable unwind device, not specifically shown, and is so wound that the coated surface thereof faces outwardly. The web 11 of coated material passes from the roll 10 and travels over a small guide roll 12 positioned adjacent a larger roll 13. The arrangement of the web 11 and rolls 12 and 13 is such that the uncoated surface of the web 11 contacts the guide roll 12, while the coated surface of the web contacts the larger roll 13. After passing around the roll 13, the web travels to a suitable wind-up device 14, including a plurality of rolls 15–17, by means of which the web is wound up in the form of a finished roll 18.

In accordance with the invention, the roll 13 is heated, as by means of steam, to a temperature such that when the coated surface of the web 11 is briefly brought into contact therewith the layer of coating material is softened, at least to the tacky state. The exact temperature of the heated roll 13 is not, in itself, critical but must be properly related to the diameter of the roll, the extent of contact of the web therewith, the melting or softening temperature of the coating material, and the speed of travel of the web so that the coating material is sufficiently heated in its passage around the roll.

Where the coating material is polyethylene, the coating layer should be brought to a temperature of at least about 250° F. by the heated roll 13, and, generally, the polyethylene should not be heated to a temperature substantially in excess of 400° F. These conditions may be met by maintaining the roll 13 at a temperature in the order of 300–400° F.

As shown in FIG. 1, the guide roll 12 causes the web 11 to be maintained in contact with the heated roll 13 over a portion of its periphery considerably in excess of 180° so that most effective use is made of the heating surface. In one form of the apparatus, the web speed, roll diameter, and extent of contact are such that the web, in passing over the heated roll 13, is maintained in contact therewith for approximately 1–2 seconds. The exact period of contact, or dwell time, is not known to be critical, except insofar as it is at least sufficient to heat the coating material to a tacky state, but not so great as to overheat the material and cause oxidation thereof or other undesirable effects. For the purpose of the claims of this application, the range of heating contemplated by the foregoing sentence is expressed in terms of heating the polyethylene to but not substantially beyond its tacky state.

In accordance with the invention, the heated roll 13 is formed of a material, such as steel, to which the coating material tends to adhere when in a tacky or softened state. Accordingly, as the web passes around the heated roll and moves out of contact therwith, there occurs what is thought to be a picking action between the roll surface and the layer of coating material, which is in a tacky condition as it moves away from the roll surface whereby the layer of coating material is rendered porous. FIG. 2 represents the action which is thought to take place as the web leaves the roll 13.

The exact nature of the action of the roll 13 on the coating material is not known, and it is not intended that the scope of the invention be limited to the expressed theory of a "picking" action. However, it is known that no substantial portion of the coating material adheres to the surface of the heated roll 13, if the method is properly carried out; yet the coating layer has substantial porosity after leaving the roll. In some cases, small particles of the coating material may adhere to the roll surface, necessitating occasional cleaning thereof, but this does not occur in quantities sufficient to attribute such adherence as the sole cause of the porosity of the processed web. It is believed, though not definitely known, that in the case of polyethylene substantial shrinkage takes place upon heating which tends to cause a multitude of minute fissures to be formed in the film of polyethylene coating material thereby rendering it or assisting in rendering it porous.

Advantageously, the speed of the web 11 and that of the heated roll 13 are accurately synchronized so that no slippage takes place therebetween. Any such slippage, as may be understood, would tend to smooth over the softened coating material and reduce the porosity otherwise imparted thereto in passing over the heated roll.

As the processed web 11' leaves the heated roll 13, the then porous layer of coating material is at an elevated temperature. Accordingly, the recoiling or rewinding device 14 is placed a short distance away from the heated roll to permit the coating material to cool well below its tacky state before being wound into a roll by the wind-up device 14.

As an alternate arrangement for carrying out the method of the invention, the apparatus of FIG. 3 may be incorporated to provide an integrated system in which the base web is first coated and the coating layer is subsequently, but in a continuous process, rendered porous. In FIG. 3, the numeral 19 designates the discharge outlet of a conventional plastic extruder. Below the outlet 19, and positioned in generally symmetrical relation thereto, are rolls 20, 21. The roll 20 may be formed of material such as steel and is adapted to be heated internally by means of steam or other suitable medium. The opposite roll 21 is provided with an outer layer 22 of silicone or similar material and may, in some cases, be provided with arrangements permitting the flow therethrough of water or other cooling medium.

The apparatus shown in FIG. 3 is generally conventional and is arranged to be operated in conjunction with a supply of base web material, whereby a web 23 of base material passes over the heated roll 20 and thence downwardly through the nip of rolls 20, 21. The roll nip is aligned directly below the extruder outlet 19 and defines a V-shaped pocket into which a thin film of plastic material, in semi-liquid form, flows from the extruder.

As shown in FIG. 3, the plastic material flowing from the extruder outlet 19 comes into contact with the silicone layer 22 of the roll 21 and with the base web 23. The web 23 and plastic material then pass through the roll nip, whereby a uniform layer of the plastic material is formed on one surface of the base web material. The plastic material, even in its semi-liquid state, does not adhere to the covered roll 21, since the outer layer 22 thereof is formed of silicone or similar material especially selected to avoid such adherence.

The coated web 11, emerging below the nip of rolls 20, 21, is passed around a suitable guide roll 24, as shown in FIG. 3, and is thereupon directed to guide roll 12 and heated roll 13, substantially in the manner indicated in FIG. 1. The arrangement is such that the coating and treating operations are carried out as part of an integral process which results in economical processing, in installations having the necessary web coating equipment.

In connection with the manufacture, by the new method, of porous, coated tea bag tissue, substantial advantages accrue in that the manufacture of tea bags may be carried out using efficient heat-sealing techniques, and in that the wet strengh of the tea bag tissue is materially increased by the coating material, permitting substantial reducion of the usual wet strength additives used in the manufacture of the base tissue. The porous layer of polyethylene or similar material imparts no undesirable taste or odor to the tea when immersed in hot or boiling water and is sufficiently porous to permit infusion through the walls of the tissue at a rate well in excess of the minimum standards of the industry.

By way of illustration, representative samples of tea bag tissue exhibit the pertinent characteristics set forth below, before and afer processing in accordance with the invention.

EXAMPLE NO. 1

*Untreated, Uncoated Tissue*

| Sample No. | Basis Weight | Gauge | Dry Tensile Strength | Wet Tensile Strength | Tear Strength | Porosity Permeometer [1] | Porosity Gurley [2] |
|---|---|---|---|---|---|---|---|
| 1 | 7.9 | 1.4 | 4.9/2.4 | 1.8/1.0 | 16/26 | 157 | 0.43 |
| 2 | 8.0 | 1.4 | 4.8/2.2 | 1.7/0.2 | 16/24 | 160 | 0.38 |
| 3 | 8.2 | 1.4 | 3.1/1.8 | 0 | 17/19 | 116 | 0.65 |
| 4 | 8.6 | 1.5 | 4.1/2.2 | 1.0/0.7 | 16/18 | 115 | 0.52 |
| 5 | 9.1 | 1.6 | 4.1/1.5 | 0 | 26/28 | 147 | 0.46 |
| 6 | 8.6 | 1.5 | 3.9/2.0 | 1.7/0.4 | 18/22 | 134 | 0.43 |
| 7 | 8.4 | 1.5 | 3.4/1.3 | 1.0/0.4 | 12/19 | 157 | 0.50 |

[1] Cubic feet per minute of air per square foot of material at ½ in. of water.
[2] Seconds taken for passage of 100 cubic centimeters of air through ¼ square inch of material under urging of 5 ounce cylinder.

EXAMPLE NO. 2

*Porous, Polyethylene Coated Tissue*

| Sample No. | Basis Weight | Gauge | Dry Tensile Strength | Wet Tensile Strength | Tear Strength | Porosity Permeometer [1] | Porosity Gurley [2] |
|---|---|---|---|---|---|---|---|
| 1 | 10.5 | 1.7 | 4.4/2.9 | 2.7/2.1 | 20.5/22.5 | 95 | 0.90 |
| 2 | 10.7 | 1.7 | 4.2/2.5 | 3.9/1.8 | 16.0/21.0 | 85 | 0.85 |
| 3 | 10.3 | 1.5 | 5.4/1.8 | 0.4/0.3 | 19.5/24.0 | 52 | 1.6 |
| 4 | 10.1 | 1.7 | 5.8/3.6 | 1.7/1.1 | 13.5/16.0 | 105 | 0.90 |
| 5 | 10.6 | 1.7 | 6.0/3.6 | 0.8/0.5 | 22.5/32.0 | 111 | 0.70 |
| 6 | 10.9 | 1.8 | 4.6/2.6 | 1.9/1.2 | 19.6/25.7 | 90 | 0.70 |
| 7 | 9.5 | 1.6 | 4.3/2.5 | 1.8/0.6 | 14.0/18.0 | 80 | 1.0 |

[1] Cubic feet per minute of air per square foot of material at ½ in. of water.
[2] Seconds taken for passage of 100 cubic centimeters of air through ¼ square inch of material under urging of 5 ounce cylinder.

Porosity, measured in cubic feet of air per minute, passing through one square foot of tissue, under pressure of ½" of water, forms a convenient basis for determining acceptability of a tissue for use in the manufacture of tea bags, at least to the extent of indicating the ease with which water will pass through the tissue. As a general rule, a porosity of 45 cubic feet per minute, per square foot, represents the acceptable minimum. As will be readily apparent, the samples of porous, coated tissue set forth in Example No. 2 are well in excess of the accepted minimum porosity value. The substantial increase in wet tensile strength will also be apparent upon comparison of equivalent samples in Example No. 1 and Example No. 2.

In the manufacture of a tea bag, using the new tea bag tissue, two layers of porous, coated tissue are placed in face-to-face relation, either by folding a single sheet or utilizing two separate sheets, as illustrated in FIG. 4. The marginal edge portions 25 of the tissue are then heat sealed together to define a bag or pouch 26, which is filled with tea. Generally, a string 27 is secured to the upper edge of the bag, as by means of a staple 28, to facilitate handling of the bag.

It should be understood that the present invention is not limited to the manufacture of tea bags and tea bag tissue, but has application for such purposes as coating papers of various types other than tea bag tissue, and for coating fabrics, the foregoing being by way of illustration and not of limitation. In connection with the coating of fabrics, important advantages accrue in that substantial improvement is realized in wearing qualities, while the porosity of the fabric, whch is of great importance in many instances, is largely retained.

As may be understood, in the making of porous, coated fabrics substantially greater quantities of coating material may be utilized, as a general rule, due to the relatively open construction of the fabric. For example, a canvas cloth, provided with a 30 lbs. per 3000 ft.² porous coating of nylon, has desirable qualities for use as a glove material.

Since the foregoing illustrations are intended to be only representative of the invention and not definitive of the scope thereof, reference should be made to the following appended claims in determining the full scope of the invention. Particularly, it should be understood that the invention is not limited to the specific arrangements illustrated and described, but encompasses broadly the concept of rendering porous a predetermined layer of normally non-porous thermoplastic material on a porous base sheet material by reason of a picking or similar action resulting from the separation of the predetermined layer of thermoplastic material, while in a tacky state, from another heated layer. The other layer need not necessarily be (as in the specific illustration) a different kind of material or even a separate and distinct layer prior to separation.

We claim:

1. The method of making porous, polyethylene coated tea bag tissue which comprises coating a base web of porous tea bag tissue on one surface with a substantially uniform, thin substantially non-porous layer of undissolved polyethylene, and rendering the polyethylene layer substantialy porous by passing the coated tissue in contact with a heated surface moving at the same speed as the tissue, the coated tissue being oriented so that the coated surface of the tissue is in direct contact with said heated surface, maintaining said coated surface in contact with said heated surface for a predetermined period of short duration to heat said polyethylene to but not substantially beyond its tacky state, and withdrawing said coated tissue from said heated surface, said heated surface constituting the sole effective heat source operative in the step of rendering said polyethylene layer substantially porous.

2. The method of claim 1, in which said heated surface is continuous and is maintained in motion at a rate such that the surface speed thereof equals the speed of movement of said coated tissue.

3. The method of processing a porous base web coated on one surface with a normally non-porous layer of undissolved heat-softenable resinous plastic material which comprises rendering said non-porous layer substantially porous by passing the coated base web in direct contact with a heated continuously moving surface, the web and heated surface being so oriented that said layer of normally non-porous material is in direct contact with said heated surface, maintaining said coated web in contact with said heated surface for a predetermined period of short duration to heat said resinous plastic material to but not substantially beyond its tacky state by causing said coated web to pass around a predetermined portion of said continuous surface, maintaining the surface speeds of said heated surface and said web substantially exactly equal during said predetermined period, and withdrawing said web from said heated surface whereby said layer of plastic material is rendered porous, said heated surface constituting the sole effective heat source operative in the step of rendering said resinous plastic material substantially porous.

4. The method of claim 3, in which said plastic material is polyethylene, and said heated surface is maintained at a temperature not substantially below 250° F.

5. The method of claim 3, in which said base web is porous tea bag tissue.

6. The method of claim 3, in which said base web is porous tea bag tissue, said normally non-porous material is polyethylene, and the amount of polyethylene in said layer is not substantially less than one-half pound per ream nor substantially more than three and one-half pounds per ream of tea bag tissue.

7. The method of processing a porous base web coated on one surface with a normally non-porous layer of undissolved heat-softenable resinous plastic material, which comprises rendering said non-porous layer substantially porous by passing the coated web in contact with a moving surface, the web and surface being so oriented that said layer of normally non-porous material is in direct contact with said surface, heating said non-porous material by said surface while said material is in contact with said surface whereby said non-porous material becomes tacky, and drawing said coated web away from said surface while said non-porous material is in a tacky condition, said heated surface constituting the sole effective heat source operative in the step of rendering said resinous plastic material substantially porous.

8. The method of claim 7, in which said normally non-porous material is polyethylene, and said polyethylene is heated to a temperature not substantially below 250° F. while said polyethylene is in contact with said surface.

9. A tea bag tissue made in accordance with the method of claim 7.

References Cited in the file of this patent

UNITED STATES PATENTS

| | | |
|---|---|---|
| Re. 14,833 | Briggs | Apr. 6, 1920 |
| 2,351,498 | Fowler | June 13, 1944 |
| 2,407,549 | Gurwick | Sept. 10, 1946 |
| 2,498,197 | Baxter | Feb. 21, 1950 |
| 2,593,553 | Francis | Apr. 22, 1952 |
| 2,631,957 | Francis | Mar. 17, 1953 |
| 2,758,036 | Cyr | Aug. 7, 1956 |
| 2,801,736 | Grow | Aug. 6, 1957 |
| 2,836,509 | Berry | May 27, 1958 |